(12) United States Patent
Zhou et al.

(10) Patent No.: US 12,518,485 B2
(45) Date of Patent: *Jan. 6, 2026

(54) THREE-DIMENSIONAL RECONSTRUCTION AND ANGLE OF VIEW SYNTHESIS METHOD FOR MOVING HUMAN BODY

(71) Applicant: ZHEJIANG UNIVERSITY, Zhejiang (CN)

(72) Inventors: Xiaowei Zhou, Hangzhou (CN); Hujun Bao, Hangzhou (CN); Sida Peng, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 196 days.

This patent is subject to a terminal disclaimer.

(21) Appl. No.: 18/331,972

(22) Filed: Jun. 9, 2023

(65) Prior Publication Data

US 2023/0316651 A1 Oct. 5, 2023

Related U.S. Application Data

(63) Continuation of application No. PCT/CN2021/090921, filed on Apr. 29, 2021.

(30) Foreign Application Priority Data

Dec. 10, 2020 (CN) .......................... 202011458091.5

(51) Int. Cl.
*G06T 17/20* (2006.01)
*G06T 3/4007* (2024.01)
(Continued)

(52) U.S. Cl.
CPC ............ *G06T 17/20* (2013.01); *G06T 3/4007* (2013.01); *G06T 7/70* (2017.01); *G06T 7/90* (2017.01); *G06V 10/82* (2022.01); *H04N 13/351* (2018.05)

(58) Field of Classification Search
CPC ........ G06T 13/40; G06T 17/00; G06V 20/653
(Continued)

(56) References Cited

U.S. PATENT DOCUMENTS

2010/0220913 A1 9/2010 Slabaugh et al.
2017/0316578 A1 11/2017 Fua et al.
(Continued)

FOREIGN PATENT DOCUMENTS

CN 105261062 A 1/2016
CN 111340944 A 6/2020
(Continued)

OTHER PUBLICATIONS

Li et al., Monocular Real-Time Volumetric Performance Capture, arXiv:2007.13988v1, Jul. 28, 2020, pp. 1-29 (Year: 2020).*
(Continued)

*Primary Examiner* — Samantha (Yuehan) Wang
(74) *Attorney, Agent, or Firm* — Wiersch Law Group

(57) ABSTRACT

Disclosed in the present invention is a three-dimensional reconstruction and angle of view synthesis method for a moving human body, which performs reconstruction of a moving human body by optimizing three-dimensional representations of the moving human body from an inputted multi-angle of view video. The method provided by the present invention comprises: defining a set of hidden variables on mesh vertices of a deformable human body model; transforming, on the basis of the deformation characteristics of the human body model, the set of structured hidden variables to a position of a target human body posture; mapping, on the basis of a neural network, the set of structured hidden variables to continuous voxel density and color for representing the geometric and appearance of the human body; and optimizing, on the basis of differentiable rendering, a neural network implicit function in an inputted
(Continued)

multi-angle of view video; and performing three-dimensional reconstruction and angle of view synthesis of the moving human body on the basis of the optimized neural network implicit function. By means of a neural network implicit function, the present invention implements three-dimensional reconstruction and angle of view synthesis of a moving human body at a very small number of angles of view, which is the first method for achieving high-quality angle of view synthesis at a very small number of angles of view.

6 Claims, 3 Drawing Sheets

(51) Int. Cl.
  *G06T 7/70* (2017.01)
  *G06T 7/90* (2017.01)
  *G06V 10/82* (2022.01)
  *H04N 13/351* (2018.01)
(58) Field of Classification Search
  USPC .......................................................... 345/420
  See application file for complete search history.

(56) References Cited

U.S. PATENT DOCUMENTS

2019/0251446 A1    8/2019   Fang et al.

| 2019/0354853 | A1* | 11/2019 | Zoldi | G06N 3/08 |
|---|---|---|---|---|
| 2019/0371080 | A1* | 12/2019 | Sminchisescu | G06T 17/20 |
| 2023/0027234 | A1* | 1/2023 | Wu | G06T 7/194 |
| 2024/0046570 | A1* | 2/2024 | Zhou | G06T 15/10 |

FOREIGN PATENT DOCUMENTS

| CN | 111462302 A | 7/2020 |
|---|---|---|
| CN | 111968238 A | 11/2020 |
| CN | 112465955 A | 3/2021 |

OTHER PUBLICATIONS

Taylor et al., Dynamical Binary Latent Variable Models for 3D Human Pose Tracking, 978-1-4244-6985-7/10/$26.00 © 2010 IEEE, pp. 631-638 (Year: 2010).*
Han et al., Image-based 3D Object Reconstruction: State-of-the-Art and Trends in the Deep Learning Era, arXiv:1906.06543v3 [cs.CV] Nov. 1, 2019, pp. 1-27 (Year: 2019).*
International Search Report (PCT/CN2021/090921); Date of Mailing: Sep. 8, 2021.
First Office Action(CN202011458091.5); Date of Mailing: Apr. 20, 2022.
Local-Implicit-Grid-Representations-for-3D-Scenes.
NeRF:representing-scenes-as-neural-radiance-fields-for-view-synthesis.

* cited by examiner

THREE-DIMENSIONAL RECONSTRUCTION AND ANGLE OF VIEW SYNTHESIS METHOD FOR MOVING HUMAN BODY

The present application is a continuation of International Application No. PCT/CN2021/090921, filed on Apr. 29, 2021, which claims priority to Chinese Application No. 202011458091.5, filed on Dec. 10, 2020, the contents of both of which are incorporated herein by reference in their entireties.

TECHNICAL FIELD

The present application relates to that field of three-dimensional reconstruction, in particularly to a method for three-dimensional reconstruction and view synthesis of a dynamic human body.

BACKGROUND

The present disclosure captures the geometry and appearance of a dynamic human body by optimizing a neural network implicit function, and carries out dynamic three-dimensional reconstruction and view synthesis. In the related art, traditional multi-view reconstruction methods often require dense input of views to ensure a complete human body reconstruction structure. Recently, some implicit function representation methods based on a neural network reconstruct a three-dimensional representation from images using differentiable rendering. However, these methods still require dense input of views. When the number of input images are insufficient, it becomes a morbid problem to learn implicit function representation from images. The present disclosure is committed to combining the dynamic information of objects in the input video to increase observations for the target, so that the implicit function representation of the optimized human body can be solvable under very sparse views.

SUMMARY

It is an object of the present application to provide a method for three-dimensional reconstruction and view synthesis of a dynamic human body in view of the deficiency of the prior art. A neural network implicit function base on structured latent variables represents the geometry and appearance of the human body, and the dynamic human body representation is reconstructed by differential rendering.

The object of the present application is achieved by the following technical solution: a method for three-dimensional reconstruction and view synthesis of a dynamic human body, including the following steps of:
(1) attaching latent variables to mesh nodes of a human model to construct a set of structured latent variables;
(2) constructing a neural network implicit function on the basis of the structured latent variables to represent geometry and appearance of the human body;
(3) rendering, by a differentiable volume renderer, the neural network implicit function into a two-dimensional image, and optimizing a representation of the neural network implicit function by minimizing an error between a corresponding frame and a corresponding view image in the rendered image and a multi-view video; and
(4) performing three-dimensional reconstruction and view synthesis of the dynamic human body based on the optimized neural network implicit function.

Further, in step (1), the human body model is a deformable human body model, and the mesh nodes of the deformable human body model are driven by a posture of the human body to change a spatial position of the constructed structured latent variables.

Further, in step (2), the step of constructing a neural network implicit function on the basis of the structured latent variables to represent geometry and appearance of the human body includes: taking the structured latent variables as a local latent variable, assigning a latent variable to any point in a three-dimensional space by a latent variable diffusion method, and regressing to a volume density and a color by the neural network implicit function.

Further, the latent variable diffusion method specifically includes: directly performing interpolation or taking nearest neighbor values for the structured latent variables, or processing the structured latent variables by using a three-dimensional network to allow interaction of information among the latent variables, and then performing trilinear interpolation or taking nearest neighbor values for the latent variables processed by the network to obtain corresponding latent variables, wherein the three-dimensional network is a point cloud processing network or a three-dimensional convolution network.

Further, in step (3), the step of rendering, by a differentiable volume renderer, the neural network implicit function into a two-dimensional image includes: sampling a set of three-dimensional points along light projected to a pixel by a camera, calculating a volume density and a color of the three-dimensional points by using the neural network implicit function, and accumulating the volume density and the color on the light to obtain a pixel color.

Further, in step (4), the three-dimensional reconstruction of the human body is realized by extracting a human mesh model from the optimized neural network implicit function by a Marching cubes algorithm, and the view synthesis is realized by obtaining a two-dimensional image by using the differentiable volume renderer.

The method has the beneficial effects that the three-dimensional reconstruction and view synthesis of a dynamic human body are realized under a very sparse view by the neural network implicit function, and the method is a first method to realize high-quality view synthesis with very sparse views; the present application combines the dynamic information of the objects in the input video to increase the observations for the target, so that the implicit function representation of the optimized human body can be solved with very sparse views; the present application can obtain high-quality human body three-dimensional reconstruction and view synthesis effects from multi-view videos.

DESCRIPTION OF EMBODIMENTS

Figure 1:
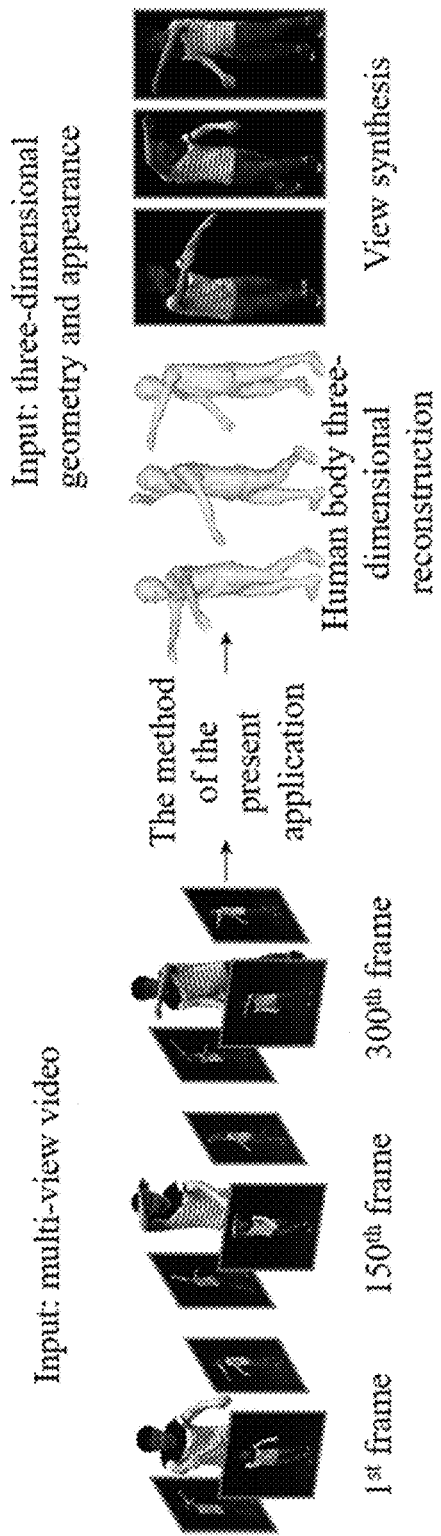
FIG. 1 is a schematic diagram of input and output according to the present application.

The technical details and principles of the present application will be further described with reference to the attached drawings:

The present application provides a three-dimensional reconstruction and view synthesis method for a dynamic human body. As shown in FIG. 1, the present application optimally reconstructs a neural network implicit function from an input multi-view video. The reconstructed implicit function can be used for three-dimensional reconstruction and view synthesis of a dynamic human body.

Figure 2:
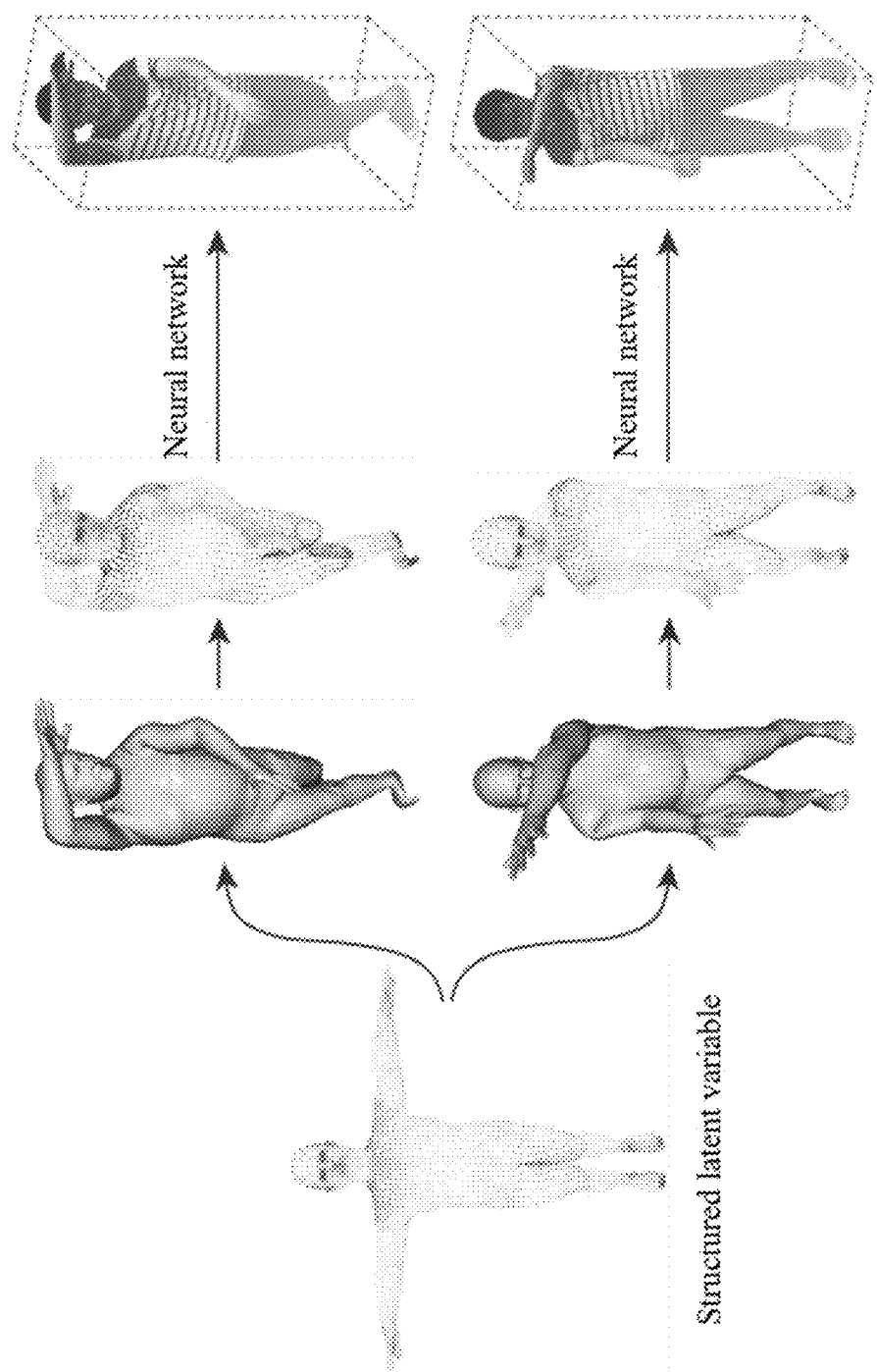
FIG. 2 is a schematic diagram of generating continuous volume densities and colors of different video frames from the same set of structured latent variables.

As shown in FIG. 2, in the method for three-dimensional reconstruction and view synthesis of a dynamic human body proposed by the present application, the specific steps of constructing structured latent variables are as follows.

1. For a deformable human model, a latent variable is defined on each mesh node of the human model, and a set of structured latent variables is obtained. In FIG. 2, according to the present application, a SMPL model is selected as the deformable human body model. SMPL is a human body mesh model that can be driven by low-dimensional parameters, and its inputs are 10-dimensional parameters representing the human body shape and 75-dimensional parameters representing the overall motion pose and relative angles of 24 joints, while its outputs are a mesh with 6890 vertices. Structured latent variables are defined on the SMPL model, and there will be 6890 latent variables $Z=\{z_1, z_2, \ldots, z_{6890}\}$. Other human body models can also be used in practical present applications.

2. For a certain video frame, the present application estimates the pose parameters corresponding to the human model, and FIG. 2 shows two examples. According to the pose parameters, the present application will drive the human model and transform the spatial positions of mesh nodes, and the positions of the latent variables Z will also be transformed to the positions of the target posture of the human body.

Figure 3:
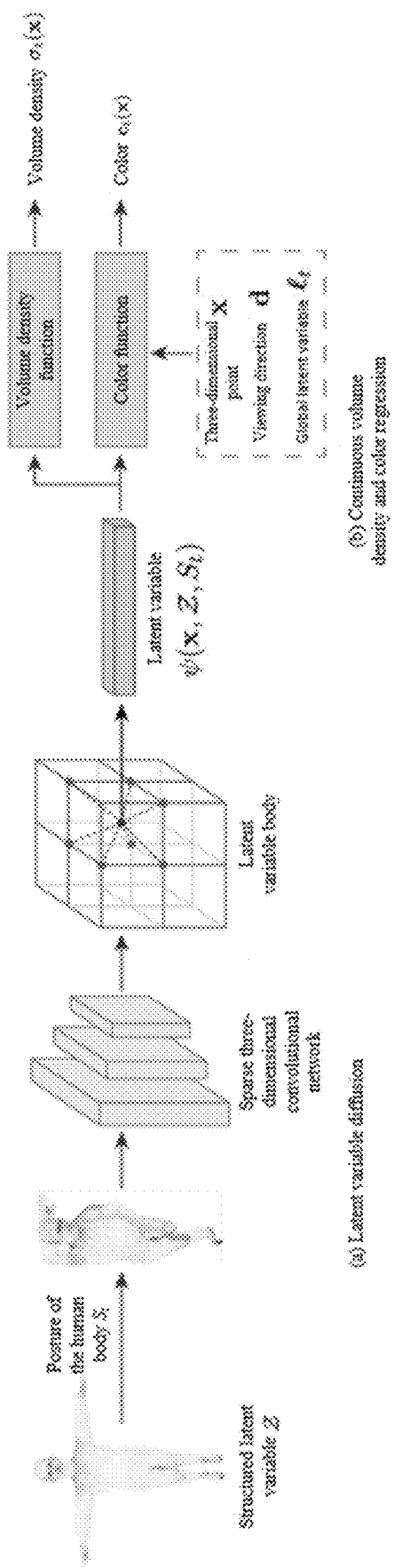
FIG. 3 is a schematic diagram of a neural network implicit function based on structured latent variables proposed by the present application, which is used for regression of continuous volume densities and colors.

As shown in FIG. 3, in the method for three-dimensional reconstruction and view synthesis of a dynamic human body proposed by the present application, the neural network implicit function based on structured latent variables represents the geometry and appearance of the human body. The specific steps are as follows.

1. As shown in FIG. 3(a), the present application assigns a latent variable to any three-dimensional point in space based on the deformed structured latent variables Z. Therefore, the present application diffuses discrete latent variables into the surrounding three-dimensional space. The diffusion process can adopt any three-dimensional network, including point cloud processing networks or three-dimensional convolution networks. In order to efficiently diffuse the latent variables, the present application adopts a sparse three-dimensional convolution network, takes the discrete latent variables as the network output, and outputs a latent variable volume. Considering that the diffusion process of latent variables will not change due to the spatial position and orientation of a person, the present application uses SMPL parameters to convert the spatial position of latent variables into a SMPL standard spatial coordinate system. Based on the latent variable volume, the present application assigns a latent variable to any three-dimensional point in space. For a point x in the three-dimensional space, the method firstly transforms the three-dimensional point into the SMPL standard space coordinate system, aligns the three-dimensional point with the latent variable volume, and then performs trilinear interpolation to obtain the corresponding latent variable. For a SMPL parameter $S_t$, the latent variable obtained at three-dimensional point x is recorded as $\psi(x, Z, S_t)$.

2. As shown in FIG. 3(b), the present application generates continuous volume densities and colors based on structured latent variables as a three-dimensional representation of the human body. The volume density field and color field here are represented by a multilayer perceptron network. For a specific frame t in multi-view video, the latent variable of three-dimensional point x is $\psi(x, Z, S_t)$. The present application predicts the volume density of three-dimensional point x as a function of the latent variable:

$$\sigma_t(x) = M_\sigma(x, Z, S_t))$$

where, $M_\sigma$ is a multi-layer perceptron network with four fully connected layers, and $\sigma_t(x)$ is the volume density of three-dimensional point x in a specific frame t.

For the color function, the present application takes the latent variable $\psi(x, Z, S_t)$ and the view direction d as the input of the function. Considering the different distributions of incident light in three-dimensional space, the present application takes three-dimensional point x as the input of the function at the same time. The present application also takes into account that some factors with time series changes will affect the appearance color of human body, such as secondary illumination and self-shadow. Therefore, the present application defines a global latent variable $\ell_t$ for each video frame in the multi-view video, which is used to encode the specific factors affecting the color of the frame. For a specific frame t in multi-view video, the color function is a function of the latent variable $\psi(x, Z, S_t)$, the viewing direction d, the three-dimensional points x and the global latent variable $\ell_t$. In order to make the network learn the high frequency function better, the present application also performs position encoding for the viewing direction d and the three-dimensional point x. The color function is defined as:

$$c_t(x) = M_c(\psi(x, Z, S_t), \gamma_d(d), \gamma_x(x), \ell_t)$$

where, $M_c$ is a multi-layer perceptron network with two fully connected layers, $\gamma_d$ and $\gamma_x$ are the position coding functions acting on the viewing direction d and three-dimensional point x respectively, and $c_t(x)$ is the color of the three-dimensional point x in a specific frame t.

In the method for three-dimensional reconstruction and view synthesis of a dynamic human body provided by the present application, the neural network implicit function representation of structured latent variables is optimized by differential rendering. The specific steps are as follows.

1. Differentiable volume rendering: a view is given, a neural network implicit function representation is converted into a two-dimensional RGB image by using a differentiable volume renderer. For each pixel of the image, the differential volume renderer accumulates the volume densities and colors on the camera ray through the integral equation to obtain the pixel colors. In actual implementation, the present application uses numerical integration for approximation. Firstly, the camera parameters are used to calculate the corresponding camera ray r, and then $N_k$ three-dimensional points $\{x_k\}_{k=1}^{N_k}$ are sampled between the nearest point and the farthest point. The nearest point and farthest point here can be calculated according to a SMPL model. Then, the present application uses the neural network implicit function to calculate the volume density and color of the three-dimensional point at each three-dimensional point. For a specific frame t in a multi-view video, the rendered color $\tilde{C}_t(r)$ of a pixel is defined as:

$$\tilde{C}_t(r) = \Sigma_{k=1}^{N_k} T_k (1 - \exp(\sigma_t(x_k)\delta_k)) c_t(x_k)$$

$$T_k = \exp(-\Sigma_{j=1}^{k-1} \sigma_t(x_j)\delta_j)$$

where $\delta_k = \|x_{k+1} - x_k\|_2$ is a distance between adjacent sampling points. By adopting differentiable volume rendering, the present application optimizes the neural network implicit function representation based on structured latent variables by minimizing the error between the corresponding frame and the corresponding view image in each frame rendered image and the multi-view video.

2. Optimization of the neural network implicit function representation based on structured latent variables is specifically as follows: the input multi-view video is $\{\mathcal{I}_t^c | c=1, \ldots, N_c, t=1, \ldots, N_t\}$, where c is a camera index, $N_c$ is the number of cameras, t is a video frame index and $N_t$ is the number of video frames. All cameras are calibrated in advance, and camera parameters are known. For each picture, the present application uses a segmentation method to segment the foreground person and sets the background pixel value to 0. Using SMPL parameters of all video frames, the present application can jointly optimize the neural network implicit function representation on the multi-view video, which is defined as:

$$\underset{\{\ell_t\}_{t=1}^{N_t}, \mathcal{Z}, \Theta}{\text{minimize}} \sum_{t=1}^{N_t} \sum_{c=1}^{N_c} L(\mathcal{I}_t^c, P^c; \ell_t, \mathcal{Z}, \Theta)$$

where $\Theta$ is a neural network parameter, $P^c$ is a camera parameter, and L the sum of the square errors of the real pixel value and the rendered pixel value. The corresponding loss function is defined as:

$$L = \Sigma_{r \in \mathcal{R}} \|\tilde{C}(r) - C(r)\|^2$$

where $\mathcal{R}$ is the set of camera rays that pass through the picture pixels and C(r) is the real pixel value.

The present application provides a method for three-dimensional reconstruction and view synthesis of a dynamic human body, which specifically includes the following steps.

1. Three-dimensional reconstruction: given multi-view video, the present application optimizes the neural network implicit function representation based on structured latent variables by a differentiable volume renderer. Based on the optimized neural network implicit function representation, the present application first needs to discretize the continuous space into uniform volumes. The present application determines the range of space based on a SMPL model. Space can be divided into a set of volumes with a size of 5 mm×5 mm×5 mm. As shown in FIG. 3, the present application calculates the volume density for each volume, and finally extracts the human mesh model by a Marching cubes algorithm.

2. View synthesis: the optimized neural network implicit function representation can be used for dynamic human free view synthesis. For a specific frame, as shown in FIG. 3, the present application uses a differentiable volume renderer to render an image by generating the continuous volume densities and colors of the specific frame t. Free-view synthesis of dynamic human body can generate a free-view video, which can give viewers the freedom to watch performers from any viewing angle. The free-view video generated by the present application has high consistency from frame to frame.

The above-mentioned embodiments are used to explain the present application, but not to limit the present application. Any modification and change made to the present application within the scope of protection of the spirit and claims of the present application shall fall within the scope of protection of the present application.

What is claimed is:

1. A method for three-dimensional reconstruction and view synthesis of a dynamic human body, comprising steps of:
   (1) attaching latent variables to mesh nodes of a human model to construct a set of structured latent variables;
   (2) constructing a neural network implicit function on the basis of the structured latent variables to represent geometry and appearance of the human body;
   (3) rendering, by a differentiable volume renderer, the neural network implicit function into a two-dimensional image, and optimizing a representation of the neural network implicit function by minimizing an error between a corresponding frame and a corresponding view image in the rendered image and a multi-view video; and
   (4) performing three-dimensional reconstruction and view synthesis of the dynamic human body based on the optimized neural network implicit function.

2. The method for three-dimensional reconstruction and view synthesis of a dynamic human body according to claim 1, wherein in step (1), the human body model is a deformable human body model, and the mesh nodes of the deformable human body model are driven by a posture of the human body to change a spatial position of the constructed structured latent variables.

3. The method for three-dimensional reconstruction and view synthesis of a dynamic human body according to claim 1, wherein in step (2), the step of constructing a neural network implicit function on the basis of the structured latent variables to represent geometry and appearance of the human body comprises: taking the structured latent variables as a local latent variable, assigning a latent variable to any point in a three-dimensional space by a latent variable diffusion method, and regressing to a volume density and a color by the neural network implicit function.

4. The method for three-dimensional reconstruction and view synthesis of a dynamic human body according to claim 3, wherein the latent variable diffusion method comprises: directly performing interpolation or taking nearest neighbor values for the structured latent variables, or processing the structured latent variables by using a three-dimensional network to allow interaction of information among the latent variables, and then performing trilinear interpolation or taking nearest neighbor values for the latent variables processed by the network to obtain corresponding latent variables, wherein the three-dimensional network is a point cloud processing network or a three-dimensional convolution network.

5. The method for three-dimensional reconstruction and view synthesis of a dynamic human body according to claim 1, wherein in step (3), the step of rendering, by a differentiable volume renderer, the neural network implicit function into a two-dimensional image comprises: sampling a set of three-dimensional points along light projected to a pixel by a camera, calculating a volume density and a color of the three-dimensional points by using the neural network implicit function, and accumulating the volume density and the color on the light to obtain a pixel color.

6. The method for three-dimensional reconstruction and view synthesis of a dynamic human body according to claim 1, wherein in step (4), the three-dimensional reconstruction of the human body is realized by extracting a human mesh model from the optimized neural network implicit function by a Marching cubes algorithm, and the view synthesis is realized by obtaining a two-dimensional image by using the differentiable volume renderer.

* * * * *